(12) United States Patent
Soltanoff

(10) Patent No.: US 8,550,820 B2
(45) Date of Patent: Oct. 8, 2013

(54) SYSTEM AND METHOD FOR A WORKSTATION INJURY AVOIDANCE PROGRAM

(76) Inventor: Gregory Soltanoff, Kingston, NY (US)

( * ) Notice: Subject to any disclaimer, the term of this patent is extended or adjusted under 35 U.S.C. 154(b) by 205 days.

(21) Appl. No.: 12/902,652

(22) Filed: Oct. 12, 2010

(65) Prior Publication Data

US 2012/0088213 A1 Apr. 12, 2012

(51) Int. Cl.
*G09B 19/00* (2006.01)

(52) U.S. Cl.
USPC .......................................... 434/257; 434/247

(58) Field of Classification Search
USPC .......... 434/227, 257, 229; 400/704; 702/176; 351/203; 482/1, 4, 8, 44, 901; 709/217; 601/33, 40
See application file for complete search history.

(56) References Cited

U.S. PATENT DOCUMENTS

| | | | |
|---|---|---|---|
| 5,792,025 A | 8/1998 | Kikinis | |
| 5,868,647 A | 2/1999 | Belsole | |
| 5,888,173 A | 3/1999 | Singhal | |
| 6,075,525 A | 6/2000 | Hsieh | |
| 6,142,910 A | 11/2000 | Heuvelman | |
| 6,468,086 B1 | 10/2002 | Brady-Koontz | |
| 6,579,209 B1 | 6/2003 | Valette et al. | |
| 7,446,762 B2 | 11/2008 | Hsieh et al. | |
| 2004/0019654 A1 | 1/2004 | Powers et al. | |
| 2007/0171364 A1 | 7/2007 | Beresford | |

*Primary Examiner* — Timothy A Musselman
(74) *Attorney, Agent, or Firm* — Schmeiser, Olsen & Watts LLP

(57) ABSTRACT

A method including the steps determining a workstation environment of a user, providing a first reminder to the user to perform a set of exercises after an interval of work, and instructing the user to perform the set of exercises after an acceptance, by the user, of the reminder to perform the set of exercises, the set of exercises tailored to the workstation environment of the user, wherein the instructions associated with the first set of exercises and the second set of exercises include a demonstration to the user to ensure the proper execution of the exercises by the user to help reduce the probability of a workstation injury. Furthermore, an associated system is also provided.

19 Claims, 8 Drawing Sheets

SYSTEM AND METHOD FOR A WORKSTATION INJURY AVOIDANCE PROGRAM

FIELD OF TECHNOLOGY

The following relates to a system and method to help reduce repetitive strain and fatigue injuries to the musculo-skeletal system, and more specifically to embodiments of a customizable workstation injury avoidance system and method.

BACKGROUND

Changes in societal ergonomics have dictated a shift in workplace strain onto the human musculo-skeletal system. A majority of home and office environments include personal computers, and prolonged use of computers in the workplace has largely replaced strain associated with traditional lifting and bending. Furthermore, paperless workstations are becoming increasingly prevalent which further limits the need for a user to stand up from the chair, retrieve files, and prepare faxes in another location in the office building. Using a computer for an extended period of time can lead to repetitive strain injuries referred to as Occupational Musculo-Skeletal Disorders (OMSD). OMSD's are a group of disorders that affect the muscles, joints, tendons, ligaments, spine and nerves, and can be associated with workplace conditions such as fixed body positions for an extended period of time without adequate recovery time (e.g. sitting in an office chair), repetitive movements (e.g. typing on a keyboard), and forced use of a particular body part. Although OMSD's may not be life threatening, they result in pain, often chronic pain, which lead to a loss of focus, reduced productivity, lost time from work, and increased healthcare costs. Additionally, workstations range from small to large, open or enclosed, private or non-private, which provides a different workstation environment. The differences in workstation environments limit an implementation of a general exercise plan for all workstations.

Thus, a need exists for a system and method for a customizable workstation injury avoidance program responsive to changes in the workstation environment to help prevent OMSD's.

SUMMARY

A first general aspect relates to a method comprising determining a workstation environment of a user, the workstation environment determined based on a plurality of factors, providing a first reminder to the user to perform a first set of exercises after a first interval of work, instructing the user to perform the first set of exercises after a first acceptance, by the user, of the reminder to perform the first set of exercises, the first set of exercises tailored to the workstation environment of the user, providing a second reminder to the user to perform a second set of exercises after a second interval of work, and instructing the user to perform the second set of exercises after a second acceptance, by the user, to perform the second set of exercises, the second set of exercises tailored to the workstation environment of the user, wherein the instructions associated with the first set of exercises and the second set of exercises include a demonstration to the user to ensure the proper execution of the exercises by the user to help reduce the probability of a workstation injury.

A second general aspect relates to a computer-implemented workstation injury avoidance method comprising presenting to a user of a computing system, by a processor of the computing system, a plurality of inquiries to determine a workstation environment of the user, receiving, by the processor of the computing system, input from the user of the computing system, wherein the input are answers to the plurality of inquiries to determine the workstation environment of the user, determining, by the processor of the computing system, the workstation environment of the user, wherein the determination of the workstation environment analyzes one or more factors of privacy, available space, and comfortability, generating, by the processor of the computing system, at least a first set of exercises and a second set of exercises customizably associated with the workstation environment of the user, presenting, by the processor of the computing system, a reminder to the user of the computing system after an interval of work, wherein the interval of work includes use of the computing system for a first period of time, receiving, by the processor of the computing system, an action by the user, wherein the action includes at least one of an acceptance, a postponement, and a cancellation of the reminder, instructing the user of the computing system, by the processor of the computing system, to perform at least one of a first set of exercises or a second set of exercises customizably associated with the workstation environment of the user for a second period of time, and returning, by the processor of the computer system, after the expiration of the second period of time, to a dormant mode until another interval of work occurs.

A third general aspect relates to a system comprising a computer system, the computer system including: a processor, an input device coupled to the processor, an output device coupled to the processor, and at least one memory devices coupled to the processor; and a workstation injury avoidance program implemented by the computer system, the workstation injury avoidance program including the steps: determining, by the processor, a workstation environment of a user, wherein the determination of the workstation environment analyzes one or more factors of privacy, available space, and comfortability input by the user into the input device, presenting, by the processor of the computing system, a reminder to the user of the computing system after a variable interval of work, wherein the variable interval of work includes use of the computing system for a first period of time, instructing the user to perform a set of exercises after an acceptance, by the user, of the reminder to perform the set of exercises, the set of exercises tailored to the workstation environment of the user, wherein the instructions associated with the set of exercises include a demonstration to the user to ensure the proper execution of the exercises by the user to help reduce the probability of a workstation injury.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
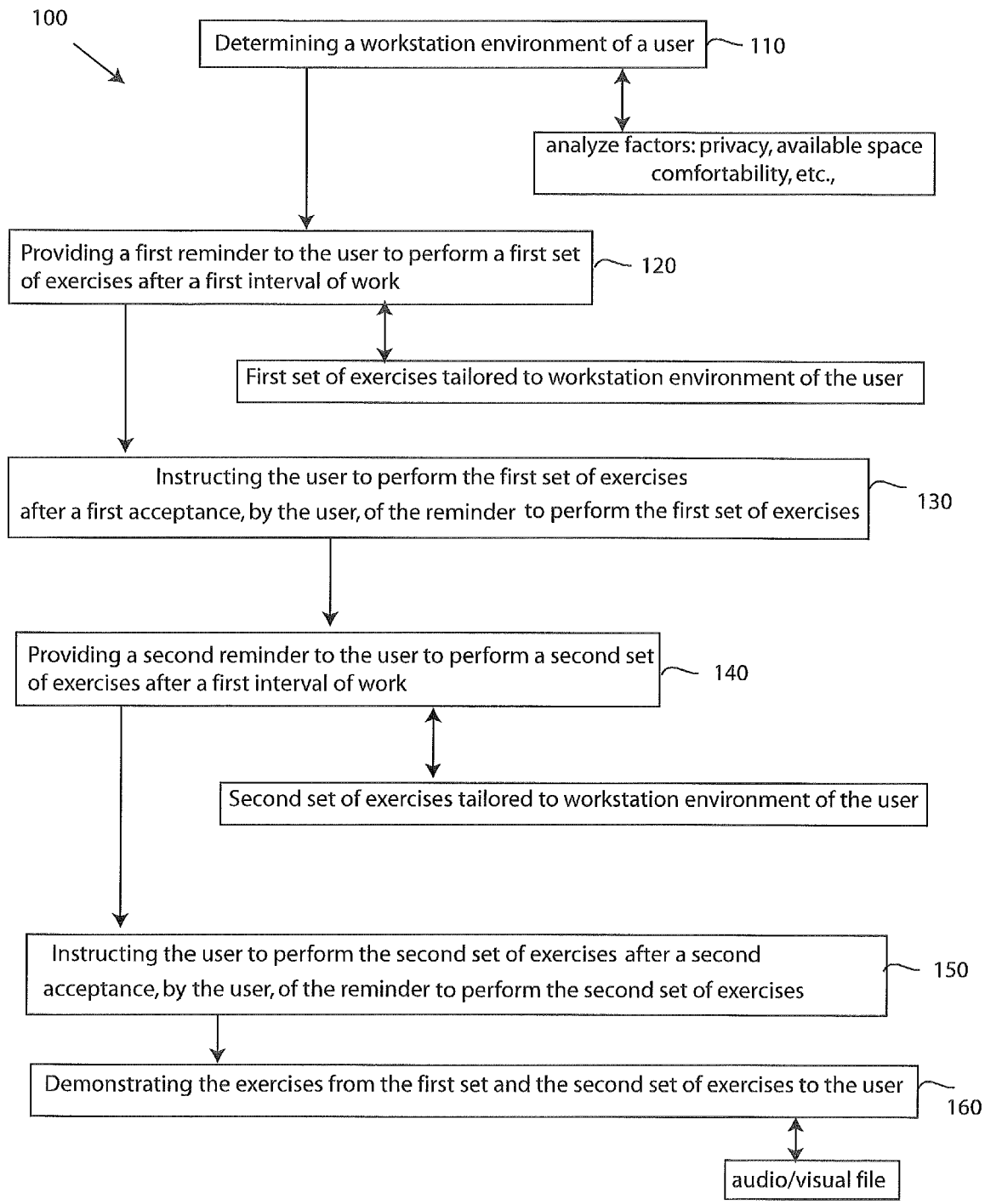
FIG. 1 depicts a flowchart of an embodiment of a workstation injury avoidance program/method.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Most home and office workstations have personal computers, and prolonged use of a computer may lead to repetitive strain, sometimes referred to as Occupational Musculo-Skeletal Disorder (OMSD). Common OMSD's can be tension headaches, carpal tunnel syndrome, thoracic outlet syndrome, and low back pain. These injuries may also be considered Cumulative Trauma Disorders (CTD). CTD's are becoming a frequent occurrence in the office setting as the time spent on the phone and computer increase. For instance, workplace musculo-skeletal disorders may account for 34% of all lost workday injuries and illnesses. Costs will be saved for each workplace musculo-skeletal disorder that is prevented.

Cumulative Trauma Disorders may be simple, ordinary movements such as repetitive motions that would not typically result in injury if only performed once. Workstation tasks, typing on a keyboard (i.e. thousands of keystrokes), communicating over the phone for an extended period of time, operating a computer for hours, repetitive motions with computer mouse, and the like are examples of ordinary movements performed repetitively which may cause injury, especially in the workplace. Resultant symptoms from repetitive workstation movements may include tingling or numbness in the hands or fingers, pain in the fingers, hands, wrists, other appendages, pain shooting up into the arms or forearms, loss of strength or coordination in the hands, headaches, neck pain, mid back and upper back burning and/or pain, lower back pain, leg and foot numbness and/or tingling, and a combination thereof. A continuous slumped posture may eventually lead to a permanent rounding of the shoulders and upper back. Additionally, a forward position of the head with an upper cervical extension may cause the cervical and upper thoracic muscles to become fatigued and strained.

Muscles require chemical energy from sugars (and in some cases oxygen) to contract and produce by-products such as lactic acid, and blood circulation assists in these processes. Muscle contractions that last for a sustained amount of time reduce blood flow, and the by-products produced by the muscles are not removed fast enough; the by-products begin to accumulate. The accumulation of these substances (i.e. by-products produced by the muscles) irritates muscles and causes pain as well as fatigue. The severity of the pain and fatigue may depend on the duration of the muscle contractions and the amount of time between activities. With respect to the body's joints, a joint is the point where two or more bones meet. There are three main types of joints: Fibrous (immovable), Cartilaginous (partially moveable) and Synovial (freely moveable). Most embodiments of the present workstation injury avoidance program will be discussed with reference to synovial joints. Synovial joints are the most common classification of joint within the human body. They are highly moveable and all have a synovial capsule (collagenous structure) surrounding the entire joint, a synovial membrane (the inner layer of the capsule) which secretes synovial fluid (a lubricating liquid) and cartilage known as hyaline cartilage which pads the ends of the articulating bones. Synovial fluid may help the cartilaginous covered joint surfaces to glide smoothly across each other. In addition to reducing joint friction, synovial fluid contains an abundance of essential nutrients that may only be absorbed during joint mobility. Lack of movement may restrict the amount of joint dependent nutrients from being absorbed resulting in joint pain and/or inflammation and stiffness. Conversely, repetitive or excessive motion of the same kind in a joint may also cause the body to produce a fluid with poor lubricating qualities also resulting in joint inflammation and pain.

With the increase in prolonged time spent seated at the workstation (i.e. lack of movement) and repetitive workstation activities (i.e. using computer typing, etc.) comes an increase in workstation induced injuries, including, in addition to injuries/symptoms discussed supra, upper cross syndrome, lower cross syndrome, cervical strain, lumbar strain and an increase to the strain to carpal tunnel and upper extremities. The injuries most commonly associated with the workstation may include headaches, upper back pain, mid back pain, low back pain, and neck pain.

Referring now to the drawings, FIG. 1 depicts an embodiment of a workstation injury avoidance program 100. The workstation injury avoidance program 100 may be a method to reduce repetitive strain and fatigue injuries to the human musculo-skeletal system, and other injuries associated with the workstation. Program 100 may be a set of instructions, a software program, a set of steps performed by a computer, a computer implemented method, a smartphone application, and the like. Moreover, the workstation injury avoidance program 100 may be used in association with any environment which promotes a lack of movement and/or where a user performs repetitive movements of a specific body part. For example, office computers may implement program 100 throughout the course of a business day, or any period wherein a user may be operating a computer. Embodiments of program 100 may include the steps of determining a user's workstation environment 110, providing a reminder to the user to exercise after an interval of work 120, and demonstrating the exercises and/or stretches 160 to the user. Thus, implementation of the workstation injury avoidance program 100 may increase blood flow and oxygen to the desired areas, affectivity reducing the possibility of injuries which may occur at a workstation. Those skilled in the art should appreciate that upon initial installation, a user may have to read and agree to an initial disclaimer and be advised to consult with a doctor before beginning program 100.

Embodiments of a method for workstation injury avoidance 100 may include determining a workstation environment of a user 110, the workstation environment determined based on a plurality of factors, providing a first reminder to the user to perform a first set of exercises after a first interval of work 120, instructing the user to perform the first set of exercises after a first acceptance, by the user, of the reminder to perform the first set of exercises 130, the first set of exercises tailored to the workstation environment of the user, providing a second reminder to the user to perform a second set of exercises after a second interval of work 140, and instructing the user to perform the second set of exercises after a second acceptance, by the user, to perform the second set of exercises 150, the second set of exercises tailored to the workstation environment of the user, wherein the instructions associated with the first set of exercises and the second set of exercises include a demonstration 160 to the user to ensure the proper execution of the exercises by the user to help reduce the probability of a workstation injury.

Figure 2:
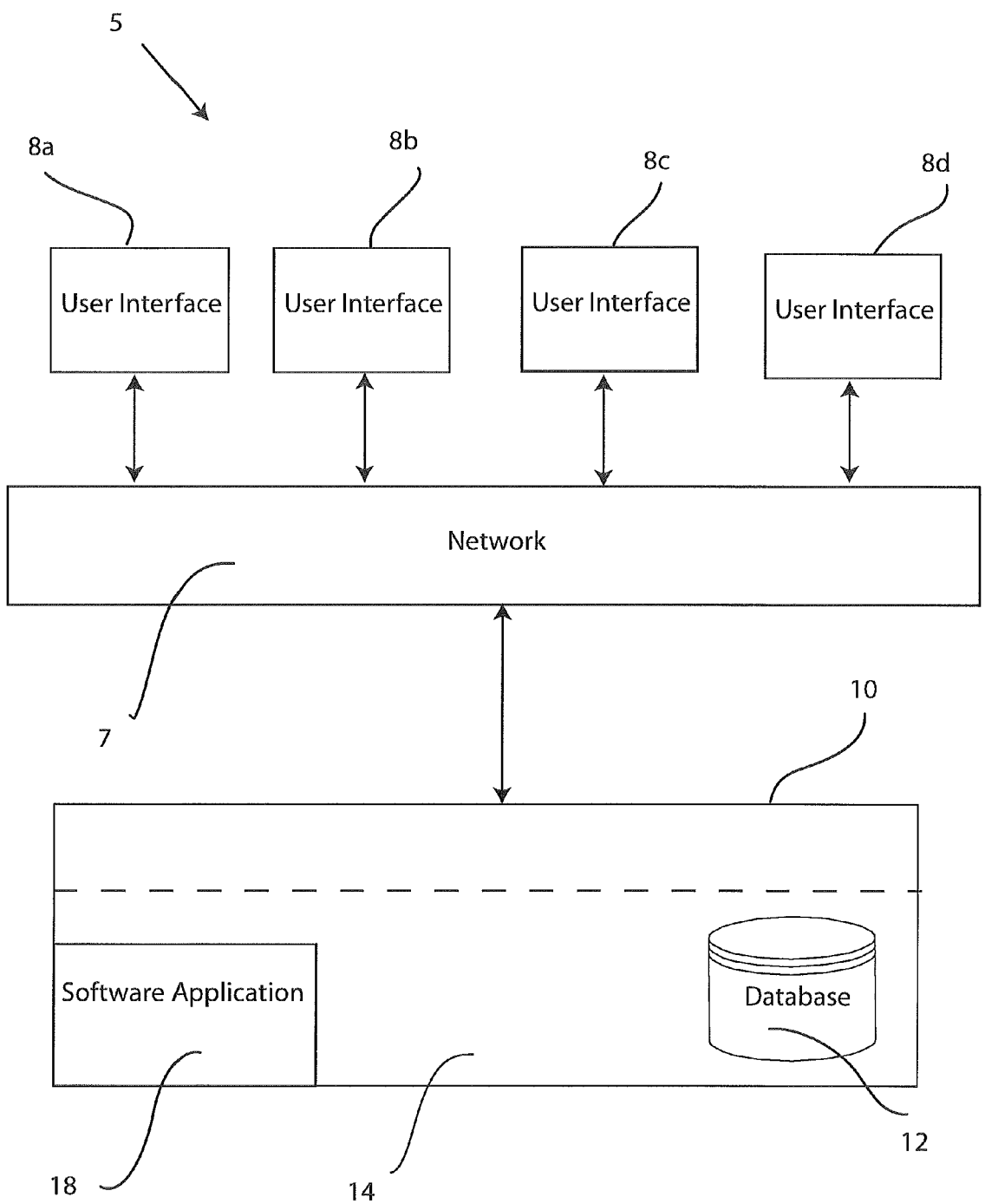
FIG. 2 depicts an embodiment of a system that is used with a computer-implemented workstation injury avoidance program/method.

Referring to FIG. 2, an embodiment of system 5 may be used to implement a workstation injury avoidance program 100. System 5 may determine a user's workstation environment to tailor specific exercises to be performed by a user based on the user's workstation environment. Moreover, system 5 may provide a reminder to the user to perform customized exercises based on the user's workstation environment after an interval of work. If a user accepts the reminder, which may be an instruction to perform a set of customized exercises, system 5 may initiate an instruction and/or demonstration of the custom exercises to guide the user through the exercises. The demonstration may be an audio demonstration, or visual demonstration, or an audio/visual demonstration, and may continue for a designated period of time. After the designated period of time to exercise expires, system 5 may return to a dormant mode for another interval or work, until the next reminder to exercise is accepted by the user.

System 5 may comprise user interfaces 8a ... 8n connected through a network 7 to a computing system 10. Network 7 may comprise any type of network including, inter alia, a telephone network, a cellular telephone network, a local area network, (LAN), a wide area network (WAN), the Internet, etc. User interfaces 8a ... 8n may comprise any type of devices capable of implementing a social network including, inter alia, a telephone, a cellular telephone, a digital assistant (PDA), a smart phone, a video game system, an audio/video player, a personal computer, a laptop computer, a computer terminal, etc. Each of user interfaces 8a ... 8n may comprise a single device or a plurality of devices. User interfaces 8a ... 8n are used by end users for communicating with each other and computing system 10. For example, users may use the user interfaces 8a ... 8n to confirm performance of an exercise or stretch associated with program 100 by communication with a processor 491. Additionally, users may input data, such as personal goals, interval times, exercises performed, favorable stretches/exercises, and other data associated with the workplace injury avoidance program 100. Computing system 10 may comprise any type of computing system(s) including, inter alia, a personal computer (PC), a server computer, a database computer, etc. Computing system 10 may be used to measure and monitor performance of exercises/stretches using devices 8a ... 8n. Computing system 10 may comprise a memory system 14. Memory system 14 may comprise a single memory system. Alternatively, memory system 14 may comprise a plurality of memory systems. Memory system 14 may also comprise a software application 18 and a database 12. Database 12 may include all retrieved and calculated data associated with measuring and monitoring the steps associated with the program 100. Software application 18 can enable a computer-implemented workstation injury avoidance program 100.

Referring back to FIG. 1, embodiments of program 100 may include the step of determining a user's workstation environment 110. A user's workstation environment may be any area occupied by a user, wherein the user works, operates a computer, performs an activity, etc. for a period of time in that area. For example, a workstation environment may be an office, a cubicle, a desk, a workplace, a computer room, a library, bedroom, suite, warehouse, and the like. Because all workstation environments are not created equal, some workstation environments provide a user with varying degrees of privacy, space, and comfortability. For instance, a user may be provided more privacy having a workstation environment with the option to close the door. An enclosed workstation environment may provide privacy to a user while performing workplace injury avoidance exercises, and which may also allow a user to feel more comfortable performing exercises requiring more movement or awkward positions. Moreover, some workstation environments provide a user with more space, room, volume, perimeter, area, etc. to perform exercises requiring more movement and/or stretching. Program 100 may offer both individuals and employers programs, a series of steps, and/or implementation of exercises and stretches specific to their workspace (e.g. a worker with only a small cubicle in which to work may do their exercises from a seated position, while in a home office the exercises recommended to the individual may include standing or floor exercises). In this regard, program 100 allows an individual to better their health and their performance while not disturbing their routine or habits and in keeping with acceptable behavior fit for their environment or business atmosphere.

Workstation environments in accordance with program 100 may include a small office, a large office, a home office, and the like. A small office may be defined by a workstation environment having less than 96 square feet (e.g. 7 feet 11 inches×11 feet 11 inches) or less in floor surface area. Those skilled in the art should appreciate that the dimensions of the small office is a single factor in the determination of a small office; the dimensions may vary slightly outside the exemplary range. Most exercises and stretches associated with the small office may be executed by a user in the seated position. For instance, a small office workstation environment may limit floor exercises associated with program 100. Embodiments of a small office may include a cubicle. Furthermore, a large office may be defined by a workstation environment larger than 96 square feet (e.g. 8 feet×12 feet). Those skilled in the art should appreciate that the dimensions of the large office is a single factor in the determination of a large office; the dimensions may vary slightly outside the exemplary range. Most exercises and stretches associated with the large office may be executed by a user in the seated position and/or standing position, but the user may not feel completely comfortable performing stretches and exercises on the ground (i.e. floor exercises). Embodiments of a large office may include a conference room, manager's office, office cafeteria, and the like. A home office may be defined by a workstation environment matching the size of at least one of the small office, and the large office, but offering immense privacy to perform certain exercises. Most exercises and stretches associated with the home office may be executed by a user in the seated position, standing position, or the ground position due to the degree of privacy found in a user's home or similar dwelling. Those skilled in the art should appreciate that other factors and/or characteristics differentiate workstation environments, and may be used to customize the exercises associated with program 100.

Furthermore, the workstation injury avoidance program 100 determines a user's workstation environment 110 to customizably instruct a user to perform stretches and/or exercises which are tailored, customized, and accommodating to the user's workstation environment. For example, the determination of the type and/or characteristics of a user's workstation environment can dictate the type of stretches and/or exercises the user can perform while remaining comfortable and safe within the allowable space of the user's workstation environment. To determine a user's workstation environment, one or more questions may be presented to the user to define his or her workstation environment. For example, a user may be prompted with questions regarding size, location, degree of privacy, ability to close door, and the like. In most embodiments, a processor may present a series of questions to the user through an output device (e.g. computer screen), wherein the processor receives the user's inputted data from the input device (e.g. keyboard) In many embodiments, the information required to determine the user's workstation environment is collected upon an initial setup of the program 100. For instance, when a user installs a software application relating to the program 100, the user may have the option to respond to questions and input data regarding workstation environment. However, the user may change the information and/or answers to the initial setup questions used to determine the workstation environment at any time during operation of the program 100. Based on the user's answers to the questions regarding workstation environment, a properly classified workstation environment is determined. Once the workstation environment is determined, a list of exercises and/or stretches suitable and efficient for the user's particular workstation environment may be generated and may be stored onto memory device 14 of computing system 10.

Moreover, embodiments of program/method 100 may include the step of providing a reminder to a user after an interval of work 120, 140. After system 5 determines the user's workstation environment, and stores the data onto memory device 14 of computing system 10, including the customized exercises based on the user's workstation environment, system 5 may continue to implement the steps of program 100. Once a user turns on their personal computer to begin work, or logs in to their computer to begin work, system 5 may start a timer to measure an interval of work. An interval of work may be a certain length of time which begins to count when the software starts to run, and continues until the user turns off/shuts down the computer or logs off of the computer. In many embodiments, the interval of time is measured whether or not the user is actually working at their computer. The duration of the interval of work, or a first period of time, may range from 30 minutes to 60 minutes. Furthermore, the intervals of work (e.g. first interval of work, second interval of work, first period of time . . . ) may be variable according to a workload of the user. For instance, the user may input into system 5 using computing system 10, a desired interval of work between reminders corresponding to the user's workload. The user's workload may correspond to a schedule, calendar, amount of work to be completed, work situation, and the like. Additionally, the variable intervals of work may be set for a day, a week, a month, or may be changed during work, such as operation of a computing system. Therefore, system 5 of program 100 may recommend/instruct the user to take a 4 minute break every 40 minutes, but the user can choose to do the 4 minute break every 60 depending on a workload of the user. Likewise, the user may select a first interval of work of 30 minutes and a second interval of work of 55 minutes, and may further vary the intervals of work through each cycle (i.e. a cycle of reminders and intervals of work). Embodiments of program 100 may also include an initial reminder, wherein an initial interval of work is longer than other intervals of work after the initial reminder. The initial reminder may be provided between 30 minutes and 100 minutes after a user initiates operation of a computing system.

Instructing a user to take a break after an interval of work is important because strain, such as strain associated with the workstation, for longer than the intervals of work can cause acute traumatic injury to the soft tissue of the muscoskeletal system. Therefore, after an interval of work passes (i.e. after the period of time associated with the interval of work expires), system 5 of program 100 may provide a reminder to the user to take a break and perform a set of exercises and/or stretches. The provided reminder may automatically "pop-up" on an output device, such as the user's computer screen. At that time, the user can be instructed to take a break, and instructed to perform a specific set of exercises designed to relieve stress on the body's tissues and joint structures as well as return blood flow and oxygen to particular regions of the spine and extremities. The specific exercises to be performed by the user are based on, or tailored to, a workstation environment of the user.

The user may choose to dismiss the reminder, returning the computer to the dormant mode, wherein the computer begins measuring, counting, timing, etc. a new interval of work. For example, if the user wishes to skip a cycle of exercises after an interval of work, the user may select the dismiss feature. Alternatively, the user may choose delay/postpone a cycle of instructed, customized exercises for a period of time. For example, if a user wishes to postpone the exercises/stretches for 5 minutes, the user may select the snooze feature. The duration of postponement may be set by the user, and may vary, for example, 5 minutes, 7 minutes, 10 minutes, 15 minutes. However, if the user accepts the reminder (e.g. by selecting a "run" or "begin" feature), system 5 may instruct the user to perform the exercises/stretches associated with their workstation environment, and store exercises/stretches they have performed in the previous cycle of exercises. The instructions to the user may also include a demonstration of the exercises/stretched to be performed by the user. The duration of the exercises to be performed by the user may range between 2-6 minutes. In one non-limiting example, the duration of exercises to be performed by the user is 4 minutes. Before the end of the exercise cycle, one or more ergonomic tips may be presented to the user. The ergonomic tip(s) may include information and/or instructions on how to utilize proper ergonomics during the dormant mode (i.e. during an interval of work), for example, comfortable sitting positions to reduce stress while working at a workstation.

Additionally, embodiments of the workstation injury avoidance program 100 may include the step of demonstrating a set of custom exercises/stretches to the user 160. If the user accepts the reminder to take a break and exercise/stretch, the user's computer may begin to present an audio, video, or audio/visual file which demonstrates the instructed exercises/stretches associated with the user's workstation environment. For example, the demonstration may include a video of a man or woman, or a plurality of women/men properly executing and explaining the exercises and/or stretches the user is instructed to perform. Alternatively, the demonstration may simply include a list of the customized exercises and/or stretches that the user may perform in a particular order. Those skilled in the art should appreciate that a combination of audio, video, and audio visual presentations may be utilized to provide a demonstration to the user to guide them through the exercise cycle. Without a demonstration or other means of presenting the proper execution of the exercises and/or stretches, the user may perform exercises and stretches that are irrelevant, or the user may improperly perform exercises and stretches that not only may fail to help reduce the probability of a workstation injury, but may actually hurt the user.

Figure 3:
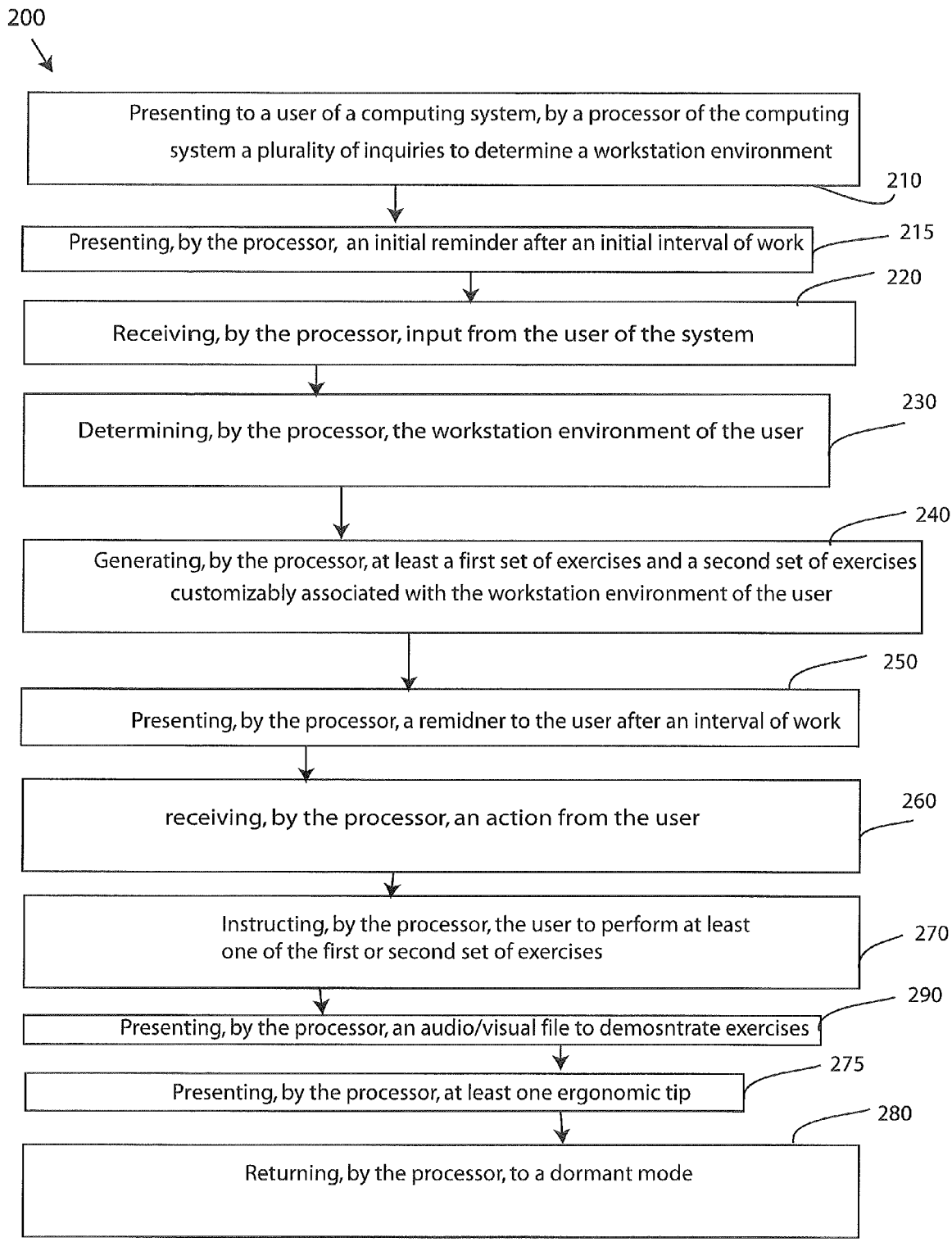
FIG. 3 depicts a flowchart of an embodiment of a computer-implemented workstation injury avoidance program.

With continued reference to the drawings, FIG. 3 illustrates an algorithm used by system 5 of FIG. 2 for implementing a workstation injury avoidance method 200. The method 200 may be a computer-implemented method to reduce repetitive strain and fatigue injuries to the musculo-skeletal system of a user, and may share the same steps and/or elements associated with program/method 100. Embodiments of workstation injury avoidance method 200 may include presenting to a user of a computing system, by a processor of the computing system (i.e., of a computing system such as, inter alia, computing system 10 of FIG. 2), a plurality of inquiries to determine a workstation environment of the user 210, receiving, by the processor of the computing system, input from the user of the computing system 220, wherein the input are answers to the plurality of inquiries to determine the workstation environment of the user, determining, by the processor of the computing system, the workstation environment of the user 230, wherein the determination of the workstation environment analyzes one or more factors of privacy, available space, and comfortability, generating, by the processor of the computing system, at least a first set of exercises and a second set of exercises 240 customizably associated with the workstation environment of the user, presenting, by the processor of the computing system, a reminder to the user of the computing system after an interval of work 250, wherein the interval of work includes use of the computing system for a first period of time, receiving, by the processor of the computing system, an action by the user 260, wherein the action includes at least one of an acceptance, a postponement, and a cancellation of the reminder, instructing the user of the computing system, by the processor of the computing system, to perform at least one of a first set of exercises or a second set of exercises 270 customizably associated with the workstation environment of the user for a second period of time, and returning, by the processor of the computer system, after the expiration of the second period of time, to a dormant mode until another interval of work occurs 280. Embodiments of method 200 may also include presenting, by the processor of the computing system, an initial reminder to the user of the computing system to perform a first set of exercises or a second set of exercises 215, wherein the initial reminder is the first reminder presented to the user after the user initially operates the computing system, and is longer than the interval of work, presenting to the user of the computing system, by the processor of the computing system, at least one ergonomic tip prior to the expiration of the second period of time 275, and presenting, by the processor of the computing system, at least one audio/visual file which demonstrates the exercises and stretches included in the first and second set of exercises 290.

Figure 4:
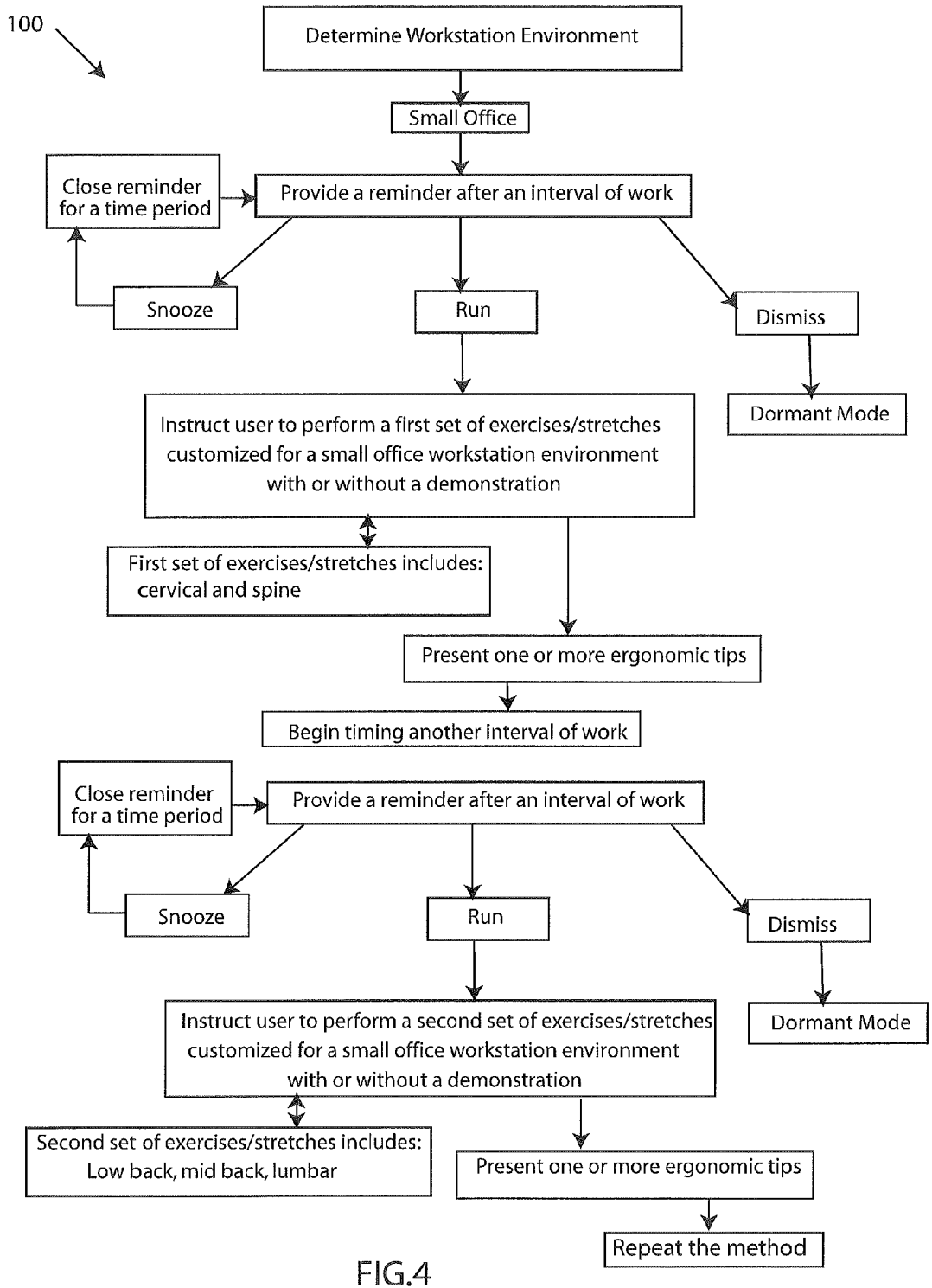
FIG. 4 depicts a flowchart of an embodiment of a workstation injury avoidance program, wherein the user has a small office workstation environment.
Figure 5:
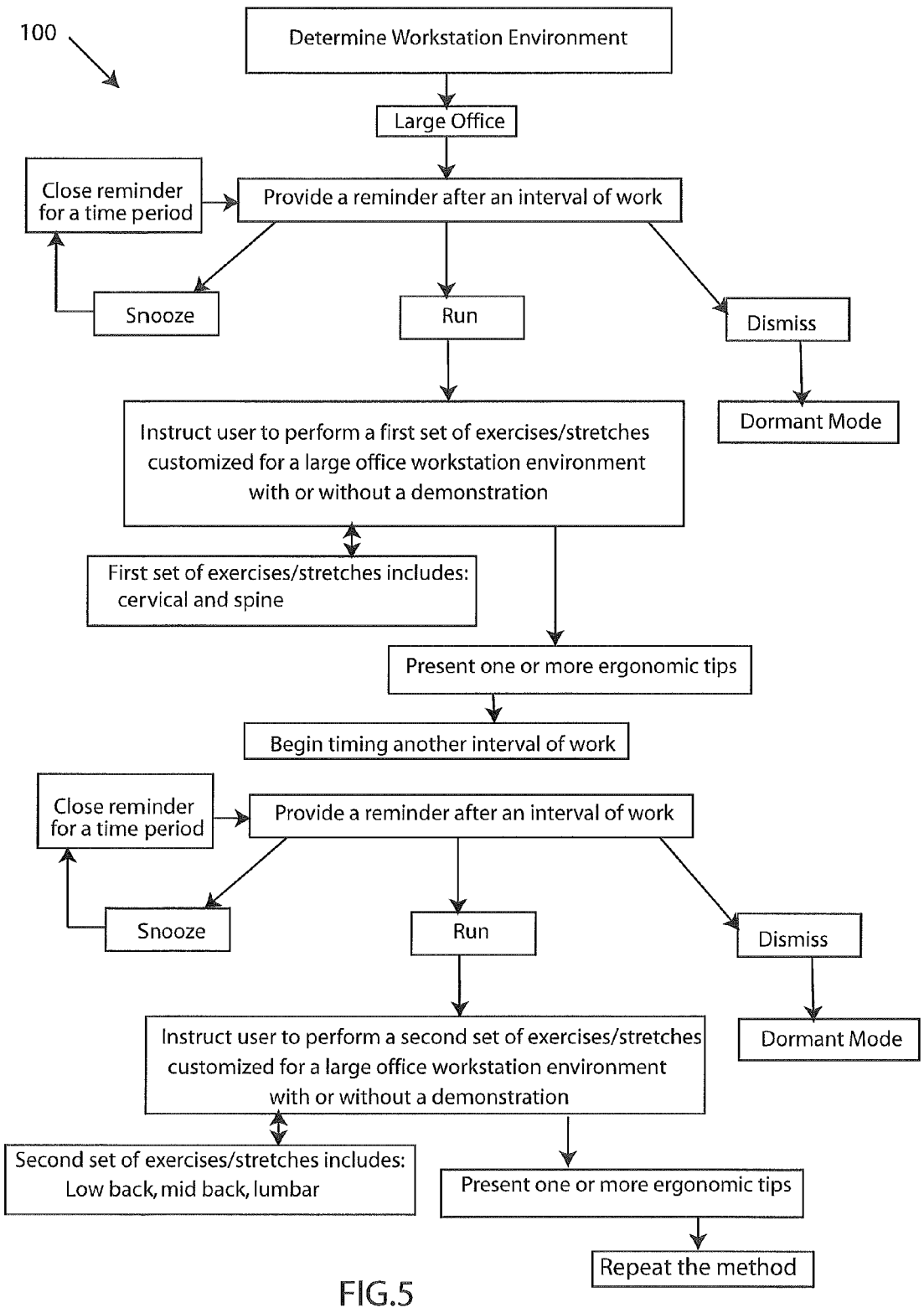
FIG. 5 depicts a flowchart of an embodiment of a workstation injury avoidance program, wherein the user has a large office workstation environment.

Referring now to FIG. 4, a plurality of sets of exercises and/or stretches tailored, customized, etc., to the small office type workstation environment are now provided. The plurality of sets of exercises and/or stretches may include one or more breaks between intervals of work. After all of the sets of exercises (e.g. break 1, break 2 . . . ) and/or stretches have been performed in order, system 5 may begin again by instructing or presenting the first set of exercises and/or stretches. Those skilled in the art should appreciate that the following list of exercises is non-exhaustive, and is simply an example of exercises which could be performed in a small office environment.

The associated exercises for a first break or first set of exercises/stretches after an interval of work in a small office workstation environment may be as follows:

Break 1

1. Bruggers Postural Relief Exercise

Bruggers may strengthen your muscles. It promotes stability and relaxes tight muscles that tighten due to postural stress. Muscles stretched are subocciptials, deep neck flexors, pect. Major and pect. Minor. Muscles strengthened are lower traps and rhomboids. To execute, a user may sit with the buttocks at the edge of a chair, spread legs apart slightly, interlock the hands behind the back (or let the hands rest on the chair behind the user) turn toes out slightly, while the user's arms are hanging by his or her side with palms out and wrists pulled back in extension. Now, a user should tilt pelvis forward and lift chest up, increasing the curvature of the lower back, squeeze the shoulder blades back and down, retract your chin straight back (do not tilt chin up or down), and hold this position for 4 seconds and return to a neutral position. This step may be repeated 5 times.

2. Cervical Spine Active Range of Motion

Muscles stretched are cervical erector spinals, paraspinals, deep neck flexors, Sternocleidomastoids, subocciptials, scalenes, Levator Scapulae, upper traps.

For flexion/extension (i.e. chin to chest stretch), a user should sit in a chair, keeping the neck, the shoulders, and the trunk straight with the chest up, and pelvis forward. Next, a user should tuck in chin and lower the head slowly, keeping the mouth closed; hold this position for 4 seconds. Return to starting position and relax, then repeat this step 5 times. Bring the head back as far as possible, looking up at the ceiling. The user should stop if any pain is felt.

For lateral flexion (i.e. ear to shoulder), a user should sit in a chair, keeping the neck, the shoulders, and the trunk straight with chest up. Now a user should tilt the head, slowly lowering the ear to the right shoulder, holding this position for 4 seconds. Return to starting position (neutral) and relax. Then, repeat the movement to the left shoulder, holding the position for 4 seconds. While performing this stretch, a user should keep the nose pointing forward and avoid raising the shoulders toward the head. The user should stop if any pain is felt. The user may repeat this step 5 times.

For rotation (i.e. cervical rotation), a user should sit at the edge of a chair, keeping the neck, the shoulders, and the trunk straight with chest up, and pelvis forward. Now, a user should turn the head bringing the chin toward the right shoulder, holding the position for 4 seconds. Return to starting position and relax. Then, repeat the movement to the left shoulder. The user may repeat this step 5 times for each side. While performing the stretch, the user should keep eyes level with the floor. The user should stop if any pain is felt.

3. Chin Glide (Time Dependent)

The chin glide is a simple but effective exercise for improved neck and head posture. Muscles stretched are suboccipitals, deep neck flexors, scalenes, and sternocleidomastoids. To execute, a user should sit up straight with chest up, then slowly glide the chin back approximately 1 to 2 inches until mild tension in the neck is felt. The user should not allow the chin to tilt down or up; it should go straight back as if forming a "double chin." While performing this stretch, a user may want to hold a finger against the chin initially and then move the chin back. Repeat 10 times, and then press the chin back with at least 2 fingers and hold for 10 seconds.

4. Wrist Stretch

Forearms can get tight from typing until you stretch them out. This simple move helps stretch those muscles in the forearms and wrists. Muscles stretched are wrist flexors and pronator teres. To execute, a user should, while seated forward at edge of chair, pelvis forward and chest up. While holding the right arm out in front, elbows locked straight, palms down, the user should take the left hand and flex the right wrist and hand as far down as they will go, holding this position for 4 seconds. Return to neutral position and repeat on the other hand. Next, the user should turn the palm up and use the other hand to extend the right wrist, holding the position for 4 seconds. Return to neutral position and repeat on the opposite wrist.

5. Shoulder Shrugs (Time Dependent)

The shoulders and neck hold a lot of stress and tension from typing, clicking and scrunching. Shoulder shrugs are a great way to relax the shoulders and get a circulation going. Muscles that benefit are upper traps and levator scapulae. To execute, a user should, while sitting straight, lift the shoulders up towards the ears, squeezing them firmly. Hold for 2 seconds and roll them back as they are relaxed down. The user may repeat for 10 reps.

6. Seated Pelvic Tilts (Time Dependent)

Muscles that benefit are the entire pelvic girdle, hip flexors, abdominals, erector spinae, and hamstrings. To execute, a user should sit up straight in the chair with the user's back against the back of the seat, feeling the natural curve in the lower back. Next, the user should place both feet flat on the floor at a hip's width distance, and tilt the pelvis back by bringing the pubic bone up towards the belly button and draw in the abs. The user should feel the lower back getting pushed flat against the seat. Then, the user may do the opposite motion of increasing the curve of the lower back. Repeat 10 times.

The associated exercises for a second break or set of exercises/stretches after an interval of work may in a small office workstation environment may be as follows:

Break 2

Example

1. Seated Pelvic Tilts

The user may sit at the forward edge of your chair with the pelvis forward and chest up. Next, the user may place the feet flat on the floor at a hip's width distance. Rock the pelvis back slowly and gently, holding for a 3 count. Return to neutral position, and repeat this 5 times, and then do the opposite motion of increasing the curve of your lower back. Repeat 5 times.

2. Seated Low Back Rotation

The user may sit at the forward edge of the chair with the pelvis forward and chest up. Next, the user's feet should remain flat on the floor in front, and then rotate the upper body to the left and hold for a 3 count. Return to center position and repeat this 5 times. Now, the user should perform the stretch to the right side, holding for a count of 3, repeating this step 5 times.

3. Seated Lateral Flexion

The user should remain seated at the forward edge of the chair with the pelvis forward and chest up. The user's feet should remain flat on the floor in front, and then lean to the left keeping the buttocks flat on the chair and hold for a 3 count. Return to center position and repeat this 5 times. Now, the user should perform the stretch to the right, holding for a count of 3, repeating this step 5 times.

4. Bruggers

The user may remain seated with the pelvis forward and shoulders back. The user should also interlock hands behind your back, or just let them rest on the chair behind. Squeeze the shoulder blades together, holding old this position for 4 seconds. Return back to neutral position and repeat this 10 times.

The associated exercises for a first break or set of exercises/stretches after an interval of work in a large office workstation environment may be as follows:

Break 1

1. Bruggers Postural Relief Exercise

Bruggers may strengthen your muscles. It promotes stability and relaxes tight muscles that tighten due to postural stress. Muscles stretched are subocciptials, deep neck flexors, pect. Major and pect. Minor. Muscles strengthened are lower traps and rhomboids. To execute, a user may sit with the buttocks at the edge of a chair, spread legs apart slightly, interlock the hands behind the back (or let the hands rest on the chair behind the user) turn toes out slightly, while the user's arms are hanging by his or her side with palms out and wrists pulled back in extension. Now, a user should tilt pelvis forward and lift chest up, increasing the curvature of the lower back, squeeze the shoulder blades back and down, retract your chin straight back (do not tilt chin up or down), and hold this position for 4 seconds and return to a neutral position. This step may be repeated 5 times.

2. Cervical Spine Active Range of Motion

Muscles stretched are cervical erector spinals, paraspinals, deep neck flexors, Sternocleidomastoids, suboccipitals, scalenes, Levator Scapulae, upper traps.

For flexion/extension (i.e. chin to chest stretch), a user should sit in a chair, keeping the neck, the shoulders, and the trunk straight with the chest up, and pelvis forward. Next, a user should tuck in chin and lower the head slowly, keeping the mouth closed; hold this position for 4 seconds. Return to starting position and relax, then repeat this step 5 times. Bring the head back as far as possible, looking up at the ceiling. The user should stop if any pain is felt.

For lateral flexion (i.e. ear to shoulder), a user should sit in a chair, keeping the neck, the shoulders, and the trunk straight with chest up. Now a user should tilt the head, slowly lowering the ear to the right shoulder, holding this position for 4 seconds. Return to starting position (neutral) and relax. Then, repeat the movement to the left shoulder, holding the position for 4 seconds. While performing this stretch, a user should keep the nose pointing forward and avoid raising the shoulders toward the head. The user should stop if any pain is felt. The user may repeat this step 5 times.

For rotation (i.e. cervical rotation), a user should sit at the edge of a chair, keeping the neck, the shoulders, and the trunk straight with chest up, and pelvis forward. Now, a user should turn the head bringing the chin toward the right shoulder, holding the position for 4 seconds. Return to starting position and relax. Then, repeat the movement to the left shoulder. The user may repeat this step 5 times for each side. While performing the stretch, the user should keep eyes level with the floor. The user should stop if any pain is felt.

3. Chin Glide (Time Dependent)

The chin glide is a simple but effective exercise for improved neck and head posture. Muscles stretched are suboccipitals, deep neck flexors, scalenes, and sternocleidomastoids. To execute, a user should sit up straight with chest up, then slowly glide the chin back approximately 1 to 2 inches until mild tension in the neck is felt. The user should not allow the chin to tilt down or up; it should go straight back as if forming a "double chin." While performing this stretch, a user may want to hold a finger against the chin initially and then move the chin back. Repeat 10 times, and then press the chin back with at least 2 fingers and hold for 10 seconds.

4. Wrist Stretch

Forearms can get tight from typing until you stretch them out. This simple move helps stretch those muscles in the forearms and wrists. Muscles stretched are wrist flexors and pronator teres. To execute, a user should, while seated forward at edge of chair, pelvis forward and chest up. While holding the right arm out in front, elbows locked straight, palms down, the user should take the left hand and flex the right wrist and hand as far down as they will go, holding this position for 4 seconds. Return to neutral position and repeat on the other hand. Next, the user should turn the palm up and use the other hand to extend the right wrist, holding the position for 4 seconds. Return to neutral position and repeat on the opposite wrist.

5. Shoulder Shrugs (Time Dependent)

The shoulders and neck hold a lot of stress and tension from typing, clicking and scrunching. Shoulder shrugs are a great way to relax the shoulders and get a circulation going. Muscles that benefit are upper traps and levator scapulae. To execute, a user should, while sitting straight, lift the shoulders up towards the ears, squeezing them firmly. Hold for 2 seconds and roll them back as they are relaxed down. The user may repeat for 10 reps.

6. Seated Pelvic Tilts (Time Dependent)

Muscles that benefit are the entire pelvic girdle, hip flexors, abdominals, erector spinae, and hamstrings. To execute, a user should sit up straight in the chair with the user's back against the back of the seat, feeling the natural curve in the lower back. Next, the user should place both feet flat on the floor at a hip's width distance, and tilt the pelvis back by bringing the pubic bone up towards the belly button and draw in the abs. The user should feel the lower back getting pushed flat against the seat. Then, the user may do the opposite motion of increasing the curve of the lower back. Repeat 10 times.

The associated exercises for a second break or set of exercises/stretches after an interval of work in a large office workstation environment may be as follows:

Break 2

Example 1

1. Bruggers Postural Relief Exercise

Brugger's Postural Relief Exercise strengthens your muscles. It promotes stability and relaxes tight muscles that tighten due to postural stress. Muscles stretched are subocciptials, deep neck flexors, pect. major and pect. minor. Muscles strengthened are lower traps and rhomboids. To execute, a user should sit with the buttocks at the edge of a chair, spread both legs apart slightly, and turn the toes out slightly, while both arms should be hanging by the side with palms out and the wrists pulled back in extension. Next, the user should tilt the pelvis forward and lift the chest up thus increasing the curve of the lower back. Now, the user should squeeze the shoulder blades back and down, retract the chin straight back, without tilting the chin either up or down, holding this position for 20 seconds and breathing deeply.

2. Standing Extensions

Muscles that benefit are hip flexors, erector spinae, and gluts. To execute, a user should start in a good posture, with the chest up, the shoulders back and down, butt muscles tight and both feet comfortably apart. Moreover, the user should keep both knees with a slight bend, and hands on the small of the back. Now, the user should arch backward slowly and smoothly about 1-4 inches while ensuring the hips are kept still, while keeping the eyes level with the floor and avoid twisting. Then the user may move back to the neutral position again and repeat 10 times. As always, the user should stop if any pain is felt.

3. Standing Pelvic Tilts

Muscles that benefit are the entire pelvic girdle, hip flexors, abdominals, erector spinae, and hamstrings. To execute, a user should stand up straight with both feet shoulder width apart, placing both feet flat on the floor at a hip's width distance. Now, the user should tilt the pelvis back by bringing the pubic bone up towards the belly button and draw in the abs. the user may do the opposite motion of increasing the curve of your lower back, and repeat 10 times.

4. Lumbar Spine Range of Motion

Muscles that benefit are Lumbar and Thoracic erector spinae, paraspinals, quadratus lumborum, abdominals, lower traps, gluts.

For flexion/extension, a user should stand upright with both arms relaxed at the sides and both feet slightly apart. Next, the user should bend forward and reach for the toes, letting gravity pull the body towards the floor, and then straighten back up and relax. Now, the user should place both hands on the small of the back and apply gentle forward pressure, arch backwards, keeping the eyes level with the floor. The user should stop if any pain is felt.

For lateral flexion, a user should stand upright with your arms relaxed at your sides and your feet slightly apart. Next, the user should bend slowly to the right, sliding a hand down the leg, while keeping both heels on the floor. Now, the user should straighten back up and relax, and then repeat to the left side. The user should stop if any pain is felt.

For rotation, a user should stand upright with both arms on the hips, and both feet slightly apart. Next, the user should twist at the waist and look over the right shoulder with the head and eyes, while keeping both feet on the floor. Now, the user should return to starting position and relax, and then repeat to the left side. The user should stop if any pain is felt.

5. Hamstring Stretch

The hamstrings are probably the most commonly tight muscles and this can contribute towards lower back pain. To execute the stretch, the user should stand with both feet hip width apart and knees with a slight bend. Next, the user should tilt the hips forwards as if sticking the buttocks in the air, bend forward. While keeping the chest up and the low back straight, the user should keep going forward slowly until a stretch in the back of the thighs (hamstrings) is felt. Hold for between 15-20 seconds.

6. Hip Flexor Stretch

The lower body also gets tight from sitting too much, especially the front of the hips. When a user sits, the gluteus muscles stretch while the hip flexors get tighter. Stretching this area several times a day can help reduce that tightness. To execute, a user should, while standing, move the right leg similar to a reverse lunge, and squeeze both gluteus muscles while bending the knees, lowering down until a stretch is felt in the front of the right hip. Hold for 15 seconds and repeat on the other side.

Break 2

Example 2

1. Bruggers

The user may sit with the buttocks at the edge of a chair. Spread the legs apart slightly with feet flat on the floor. The user should interlock your hands behind your back, or just let them rest on the chair behind. Tilt the pelvis forward and lift the chest. Next, the user should squeeze the shoulder blades together and down, bringing the chin directly back as if making a double chin. Hold this position for 5 seconds and return back to neutral position, repeating this an additional 2 times.

2. Standing Extensions

The user should be standing in a good posture with the chest up, shoulders back and down. The butt muscles should be tight and feet comfortably apart. While keeping knees with a slight bend, and hands on the small of the back, arch backward slowly and smoothly just 1-4 inches while ensuring that the hips are kept still. Keep eyes level with the floor and avoid twisting, and always stop before any pain. Then, the user should move back to the neutral position again and repeat an additional 3 times 3. Touch Toes and Lean back The user should stand upright with arms relaxed at the sides and feet slightly apart. Bend forward and reach for the toes. Let gravity pull body towards the floor, and then straighten back up and relax. Place the hands on the small of the back and apply gentle forward pressure. Arch backwards, keeping eyes level with the floor. Stop movement if any pain is felt. Repeat one more time.

4. Side Bends

The user should stand upright with the arms relaxed at the sides and feet slightly apart. Bend slowly to the right, sliding the right hand down the outside of the right thigh. Keeping both heels on the floor, straighten back up and relax. Repeat to the left side. Straighten back up and relax Repeat one more time to each side.

5. Standing Twists

The user should stand upright with the arms on the hips, and feet slightly apart. Twist at the waist and look over the right shoulder with the head and eyes, while keeping both feet flat on the floor. Return to starting position and relax. Repeat to the left side. Return to starting position and relax Repeat one more time to each side.

6. Hamstring Stretches

The user should stand with feet hip width apart and knees with a slight bend. Next, the user should tilt the hips forward as if sticking the hindquarters in the air, bend forward, keeping the chest up and low back straight. Keep going forward slowly until a stretch in the back of the thighs (hamstrings) is felt. Hold this position for approximately 10 seconds, and then slowly return to the starting position. Repeat one more time.

7. Hip Flexors

While standing, the user should place the hands on hips, then move the right leg back and place the right foot on the ground approximately 3 feet back, similar to performing a reverse lunge. Next, the user should bend both knees, lowering down until a stretch in the front of the right hip is felt. Hold for 10 seconds, then return the right foot back to the starting position. Now repeat with bringing the left foot back and stretching the front of the left hip. Return left back to the starting position.

Figure 6:
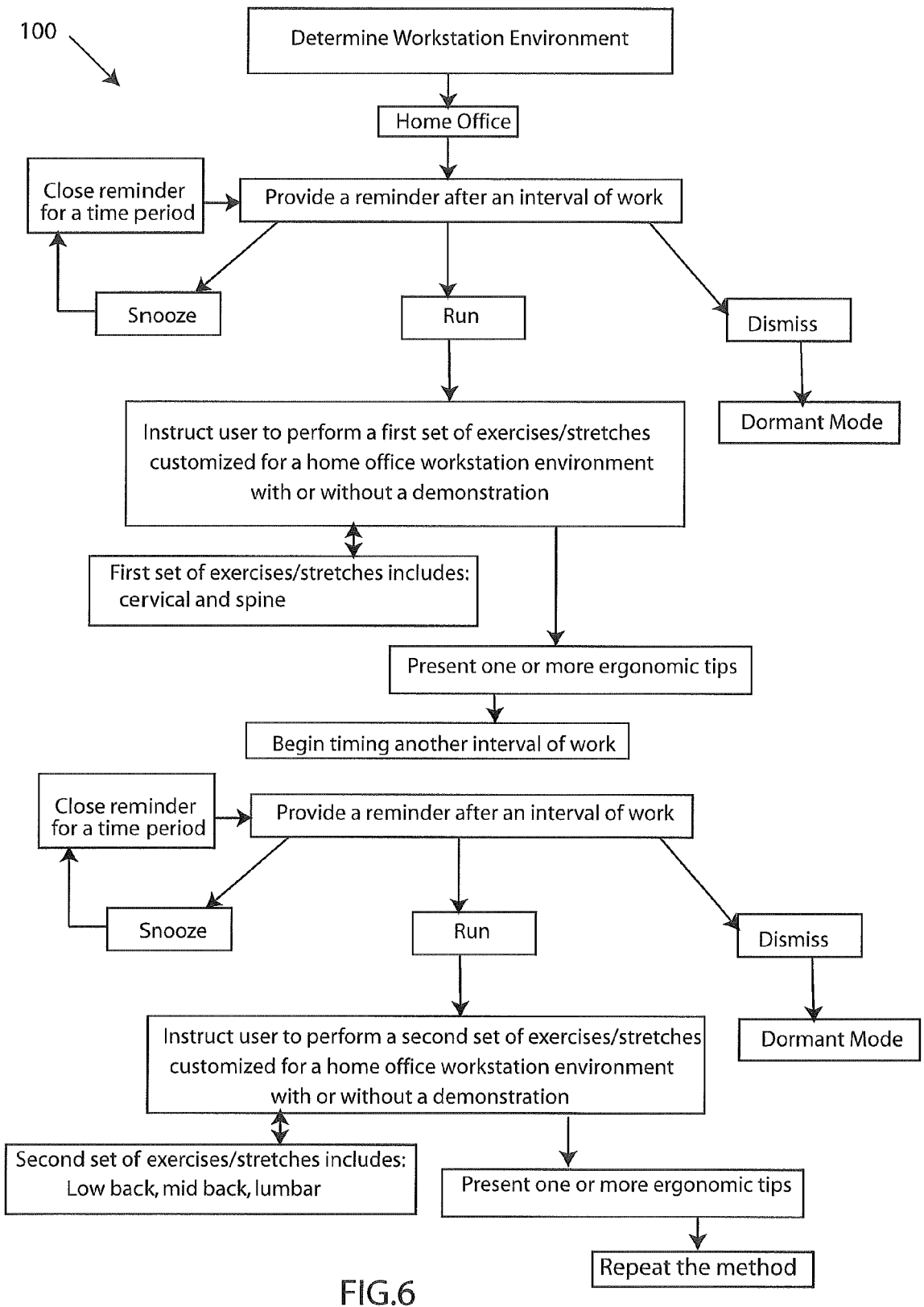
FIG. 6 depicts a flowchart of an embodiment of a workstation injury avoidance program, wherein the user has a home office workstation environment.

Referring now to FIG. 6, a plurality of sets of exercises and/or stretches tailored, customized, etc., to the home office type workstation environment are now provided. The plurality of sets of exercises and/or stretches may include one or more breaks between intervals of work. After all of the sets of exercises (e.g. break 1, break 2 . . . ) and/or stretches have been performed in order, system 5 may begin again by instructing or presenting the first set of exercises and/or stretches. Those skilled in the art should appreciate that the following list of exercises is non-exhaustive, and is simply an example of exercises which could be performed in a home office environment.

The associated exercises for a first break or set of exercises/ stretches after an interval of work in a home office workstation environment may be as follows:

Break 1

1. Bruggers Postural Relief Exercise

Bruggers may strengthen your muscles. It promotes stability and relaxes tight muscles that tighten due to postural stress. Muscles stretched are subocciptials, deep neck flexors, pect. Major and pect. Minor. Muscles strengthened are lower traps and rhomboids. To execute, a user may sit with the buttocks at the edge of a chair, spread legs apart slightly, interlock the hands behind the back (or let the hands rest on the chair behind the user) turn toes out slightly, while the user's arms are hanging by his or her side with palms out and wrists pulled back in extension. Now, a user should tilt pelvis forward and lift chest up, increasing the curvature of the lower back, squeeze the shoulder blades back and down, retract your chin straight back (do not tilt chin up or down), and hold this position for 4 seconds and return to a neutral position. This step may be repeated 5 times.

2. Cervical Spine Active Range of Motion

Muscles stretched are cervical erector spinals, paraspinals, deep neck flexors, Sternocleidomastoids, suboccipitals, scalenes, Levator Scapulae, upper traps.

For flexion/extension (i.e. chin to chest stretch), a user should sit in a chair, keeping the neck, the shoulders, and the trunk straight with the chest up, and pelvis forward. Next, a user should tuck in chin and lower the head slowly, keeping the mouth closed; hold this position for 4 seconds. Return to starting position and relax, then repeat this step 5 times. Bring the head back as far as possible, looking up at the ceiling. The user should stop if any pain is felt.

For lateral flexion (i.e. ear to shoulder), a user should sit in a chair, keeping the neck, the shoulders, and the trunk straight with chest up. Now a user should tilt the head, slowly lowering the ear to the right shoulder, holding this position for 4 seconds. Return to starting position (neutral) and relax. Then, repeat the movement to the left shoulder, holding the position for 4 seconds. While performing this stretch, a user should keep the nose pointing forward and avoid raising the shoulders toward the head. The user should stop if any pain is felt. The user may repeat this step 5 times.

For rotation (i.e. cervical rotation), a user should sit at the edge of a chair, keeping the neck, the shoulders, and the trunk straight with chest up, and pelvis forward. Now, a user should turn the head bringing the chin toward the right shoulder, holding the position for 4 seconds. Return to starting position and relax. Then, repeat the movement to the left shoulder. The user may repeat this step 5 times for each side. While performing the stretch, the user should keep eyes level with the floor. The user should stop if any pain is felt.

3. Chin Glide (Time Dependent)

The chin glide is a simple but effective exercise for improved neck and head posture. Muscles stretched are suboccipitals, deep neck flexors, scalenes, and sternocleidomastoids. To execute, a user should sit up straight with chest up, then slowly glide the chin back approximately 1 to 2 inches until mild tension in the neck is felt. The user should not allow the chin to tilt down or up; it should go straight back as if forming a "double chin." While performing this stretch, a user may want to hold a finger against the chin initially and then move the chin back. Repeat 10 times, and then press the chin back with at least 2 fingers and hold for 10 seconds.

4. Wrist Stretch

Forearms can get tight from typing until you stretch them out. This simple move helps stretch those muscles in the forearms and wrists. Muscles stretched are wrist flexors and pronator teres. To execute, a user should, while seated forward at edge of chair, pelvis forward and chest up. While holding the right arm out in front, elbows locked straight, palms down, the user should take the left hand and flex the right wrist and hand as far down as they will go, holding this position for 4 seconds. Return to neutral position and repeat on the other hand. Next, the user should turn the palm up and use the other hand to extend the right wrist, holding the position for 4 seconds. Return to neutral position and repeat on the opposite wrist.

5. Shoulder Shrugs (Time Dependent)

The shoulders and neck hold a lot of stress and tension from typing, clicking and scrunching. Shoulder shrugs are a great way to relax the shoulders and get a circulation going. Muscles that benefit are upper traps and levator scapulae. To execute, a user should, while sitting straight, lift the shoulders up towards the ears, squeezing them firmly. Hold for 2 seconds and roll them back as they are relaxed down. The user may repeat for 10 reps.

6. Seated Pelvic Tilts (Time Dependent)

Muscles that benefit are the entire pelvic girdle, hip flexors, abdominals, erector spinae, and hamstrings. To execute, a user should sit up straight in the chair with the user's back against the back of the seat, feeling the natural curve in the lower back. Next, the user should place both feet flat on the floor at a hip's width distance, and tilt the pelvis back by bringing the pubic bone up towards the belly button and draw in the abs. The user should feel the lower back getting pushed flat against the seat. Then, the user may do the opposite motion of increasing the curve of the lower back. Repeat 10 times.

The associated exercises for a second break or set of exercises/stretches after an interval of work in a home office workstation environment may be as follows:

Break 2

Example 1

1. Bruggers Postural Relief Exercise

Brugger's Postural Relief Exercise strengthens your muscles. It promotes stability and relaxes tight muscles that tighten due to postural stress. Muscles stretched are subocciptials, deep neck flexors, pect. major and pect. minor. Muscles strengthened are lower traps and rhomboids. To execute, a user should sit with the buttocks at the edge of a chair, spread both legs apart slightly, and turn the toes out slightly, while both arms should be hanging by the side with palms out and the wrists pulled back in extension. Next, the user should tilt the pelvis forward and lift the chest up thus increasing the curve of the lower back. Now, the user should squeeze the shoulder blades back and down, retract the chin straight back, without tilting the chin either up or down, holding this position for 20 seconds and breathing deeply.

2. Standing Extensions

Muscles that benefit are hip flexors, erector spinae, and gluts. To execute, a user should start in a good posture, with the chest up, the shoulders back and down, butt muscles tight and both feet comfortably apart. Moreover, the user should keep both knees with a slight bend, and hands on the small of the back. Now, the user should arch backward slowly and smoothly about 1-4 inches while ensuring the hips are kept still, while keeping the eyes level with the floor and avoid twisting. Then the user may move back to the neutral position again and repeat 10 times. As always, the user should stop if any pain is felt.

3. Lumbar Spine Range of Motion

Muscles that benefit are Lumbar and Thoracic erector spinae, paraspinals, quadratus lumborum, abdominals, lower traps, gluts.

For flexion/extension, a user should stand upright with both arms relaxed at the sides and both feet slightly apart. Next, the user should bend forward and reach for the toes, letting gravity pull the body towards the floor, and then straighten back up and relax. Now, the user should place both hands on the small of the back and apply gentle forward pressure, arch backwards, keeping the eyes level with the floor. The user should stop if any pain is felt.

For lateral flexion, a user should stand upright with your arms relaxed at your sides and your feet slightly apart. Next, the user should bend slowly to the right, sliding a hand down the leg, while keeping both heels on the floor. Now, the user should straighten back up and relax, and then repeat to the left side. The user should stop if any pain is felt.

For rotation, a user should stand upright with both arms on the hips, and both feet slightly apart. Next, the user should twist at the waist and look over the right shoulder with the head and eyes, while keeping both feet on the floor. Now, the user should return to starting position and relax, and then repeat to the left side. The user should stop if any pain is felt.

4. Hamstring Stretch

The hamstrings are probably the most commonly tight muscles and this can contribute towards lower back pain. To execute the stretch, the user should stand with both feet hip width apart and knees with a slight bend. Next, the user should tilt the hips forwards as if sticking the buttocks in the air, bend forward. While keeping the chest up and the low back straight, the user should keep going forward slowly until a stretch in the back of the thighs (hamstrings) is felt. Hold for between 15-20 seconds.

5. Hip Flexor Stretch

The lower body also gets tight from sitting too much, especially the front of the hips. When a user sits, the gluteus muscles stretch while the hip flexors get tighter. Stretching this area several times a day can help reduce that tightness. To execute, a user should, while standing, move the right leg similar to a reverse lunge, and squeeze both gluteus muscles while bending the knees, lowering down until a stretch is felt in the front of the right hip. Hold for 15 seconds and repeat on the other side.

5. Supine Pelvic Tilts

Muscles that benefit are the entire pelvic girdle, hip flexors, abdominals, erector spinae, and hamstrings. To execute, a user should lie on the floor with the spine in a neutral position—neither arched nor tilted forward. Next, the user should tilt the pelvis back by bringing the pubic bone up towards the belly button and draw in abs, feeling the lower back get pushed flat against the floor. Then do the opposite motion of increasing the curve of the lower back. Repeat 10 times.

6. Cat Camels

Muscles that benefit are cervical, thoracic, and lumbar erector spinae, paraspinals, abdominals, gluts, hip flexors. To execute, a user should kneel on an exercise mat or floor, positioning both knees and feet hip-width apart, with the toes pointing towards the body. Next, the user should slowly lean forward to place both hands on the mat, positioning them directly under the shoulders at shoulder-width, with the hands facing forward. Reposition the hands and knees as necessary so that both knees are directly under the hips and the hands are directly under the shoulders. Now, the user should gently stiffen the core and abdominal muscles to position the spine in a neutral position, avoiding any sagging or arching. In an upward movement (i.e. cat phase) the user should exhale and contract the abdominal muscles, pushing the spine upwards towards the ceiling, holding this position for 10-15 seconds, allowing the head to fall towards the chest, maintaining alignment with the spine. Alternatively, in a downward movement (i.e. cow phase) the user should slowly relax and yield to the effects of gravity, letting the stomach fall towards the floor (e.g. increasing the arch in the lower back) and allowing the shoulder blades to fall together (e.g. move towards the spine). Next, the user should raise the chin and look up towards the ceiling, holding this position for 10-15 seconds before returning to the starting position.

7. Bird Dogs

Muscles that benefit are cervical, thoracic, and lumbar erector spinae, paraspinals, abdominals, gluts, hip flexors. To execute, a user should get on their hands and knees (hands directly below the shoulders, knees directly below the hips), keeping the back straight (flat) throughout the exercise. Next, the user should slowly lift the right leg backwards, and the left arm forward, such that they are parallel to the floor, holding this position for 5 seconds and relax. Repeat with the opposite arm and leg, and repeat the whole process 5 times. The user may progress by holding the position longer each time, for example, holding the position for 10 seconds. The pressure should be felt mainly in the lower back and bottom, but the user should focus on the core while keeping balanced working the abs. The user should avoid letting the hips tilt to one side while moving the legs. Keep breathing naturally.

Break 2

Example 2

1. Bruggers

The user may sit with the buttocks at the edge of a chair. Spread the legs apart slightly with feet flat on the floor. The user should interlock your hands behind your back, or just let them rest on the chair behind. Tilt the pelvis forward and lift the chest. Next, the user should squeeze the shoulder blades together and down, bringing the chin directly back as if making a double chin. Hold this position for 5 seconds and return back to neutral position, repeating this an additional 2 times.

2. Standing Extensions

Muscles that benefit are hip flexors, erector spinae, and gluts. To execute, a user should start in a good posture, with the chest up, the shoulders back and down, butt muscles tight and both feet comfortably apart. Moreover, the user should keep both knees with a slight bend, and hands on the small of the back. Now, the user should arch backward slowly and smoothly about 1-4 inches while ensuring the hips are kept still, while keeping the eyes level with the floor and avoid twisting. Then the user may move back to the neutral position again and repeat 10 times. As always, the user should stop if any pain is felt.

3. Supine Pelvic Tilts

The user should lie on the floor, on the back, the spine being in a neutral position—neither arched nor tilted forward. Next, the user should bend the knees so the feet are resting comfortably flat on the ground. Tilt the pelvis back by bringing the pubic bone up towards your belly button and draw in the abs. Feel the lower back get pushed flat against the floor. Then do the opposite motion of increasing the curve of the lower back by pushing the pubic bone away from your belly button, and repeat 3 more times.

4. Cat Camels

The user should position the knees and feet hip-width apart, and the hands should be directly under the shoulders at shoulder-width, with the palms down, fingers facing forward, and with elbows slightly bent. Next, the user should reposition the hands and knees as necessary so that the knees are directly under the hips and hands are directly under the shoulders. Gently stiffen the core and abdominal muscles to position the spine in a neutral position, avoiding any sagging or arching.

Upward Phase: Gently exhale and contract the abdominal muscles, pushing the spine upwards towards the ceiling while pulling the pubic bone towards the belly button, allow the head to fall towards the chest and hold this position for 5 seconds.

Downward Phase: Slowly relax and yield to the effects of gravity. Let the stomach fall towards the floor (increasing the arch in the low back) and allow the shoulder blades to come together (move towards the spine). Raise the chin and look up towards the ceiling. Push the pubic bone away from the bellybutton to increase the arch in the low back, hold this position for 5 seconds before returning to the starting position, and slowly repeat the upward and downward phase an additional 3 times.

5. Bird Dogs

The user should remain on their hands and knees (hands directly below the shoulders, knees directly below the hips), keeping the back straight (flat) and core tight throughout this exercise. Slowly lift the right leg backwards as the right straightens. Next, the user may lift the left arm forwards, so the arms are both parallel to the floor, holding the position for 5 seconds and then returning both the right knee and the left hand to the floor. Repeat with the opposite leg and opposite arm. Repeat the whole process 3 additional times. The user may feel the pressure mainly in the lower back and bottom. The user should also remember to focus on the core and keep balanced by working the abs also, without letting the hips tilt to one side while moving the legs. Keep breathing naturally.

Figure 7:
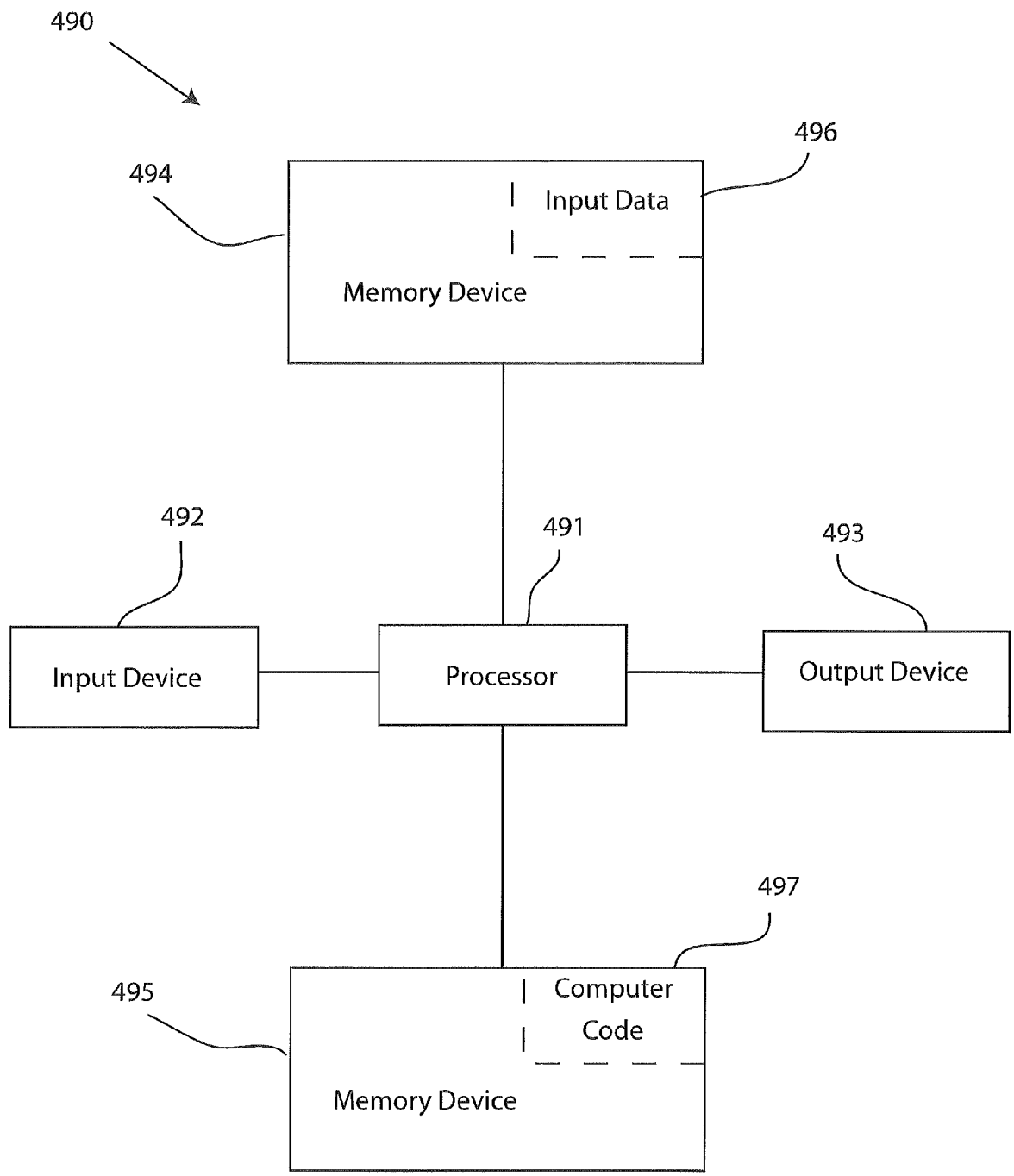
FIG. 7 depicts an embodiment of a computer apparatus used with a computer-implemented workstation injury avoidance program/method.

Referring now to FIG. 7, an embodiment of a computer apparatus 490 (e.g., computing system 10 of FIG. 2) used for workstation injury avoidance, is now described. The computer system 490 comprises a processor 491, an input device 492 coupled to the processor 491, an output device 493 coupled to the processor 491, and memory devices 494 and 495 each coupled to the processor 491. The input device 492 may be, inter alia, a keyboard, a software application, a mouse, etc. The output device 493 may be, inter alia, a printer, a plotter, a computer screen, a magnetic tape, a removable hard disk, a floppy disk, a software application, etc. The memory devices 494 and 495 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 495 includes a computer code 497. The computer code 497 includes algorithms or steps (e.g., the algorithms and/or steps of FIGS. 1-6) for a workstation injury avoidance program 100. The processor 491 executes the computer code 497. The memory device 494 includes input data 496. The input data 496 includes input required by the computer code 497. The output device 493 displays output from the computer code 497. Either or both memory devices 494 and 495 (or one or more additional memory devices not shown in FIG. 2) may comprise the algorithms and/or steps of FIGS. 1-6 and may be used as a computer usable medium (or a computer readable medium or a program storage device) having a computer readable program code embodied therein and/or having other data stored therein, wherein the computer readable program code comprises the computer code 497. Generally, a computer program product (or, alternatively, an article of manufacture) of the computer system 490 may comprise the computer usable medium (or said program storage device). While FIG. 7 shows the computer system 490 as a particular configuration of hardware and software, any configuration of hardware and software, as would be known to a person of ordinary skill in the art, may be utilized for the purposes stated supra in conjunction with the particular computer system 490. For example, the memory devices 494 and 495 may be portions of a single memory device rather than separate memory devices. Therefore, computing system 10 and/or software application 18 can enable a computer-implemented workstation injury avoidance program 100, 200, 300.

Figure 8:
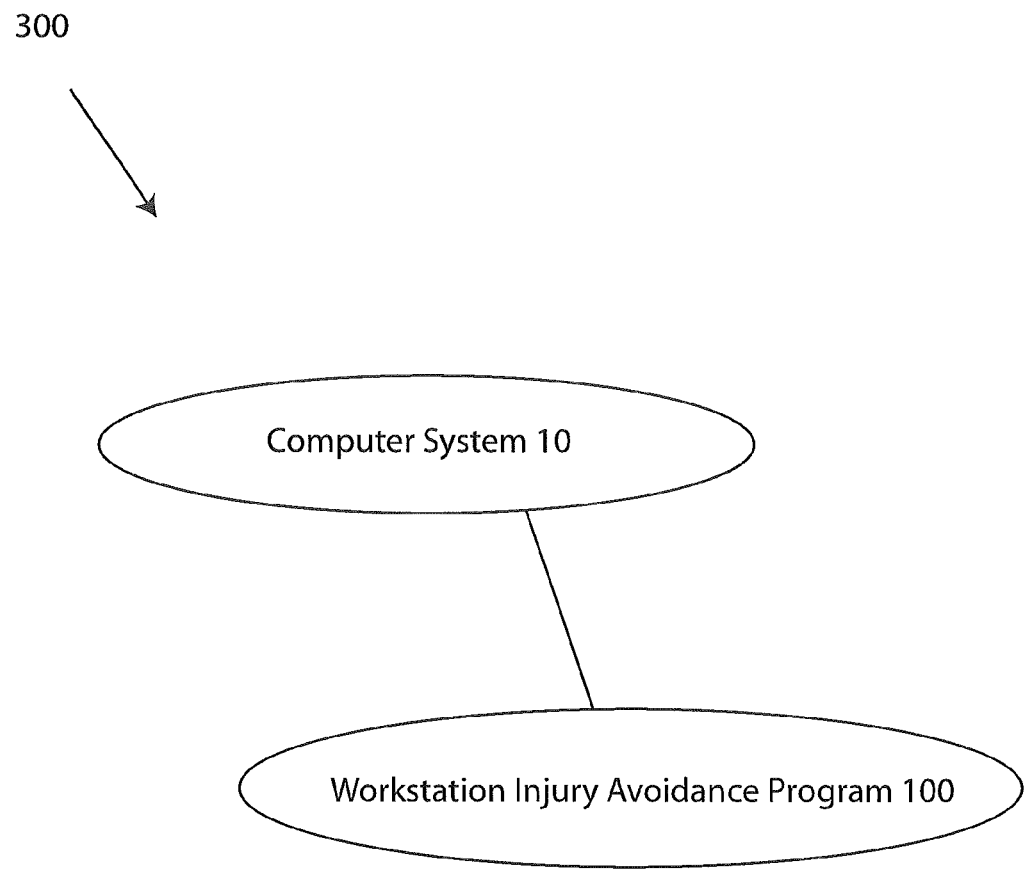
FIG. 8 depicts a schematic view of an embodiment of system associated with the workstation injury avoidance program.

With continued reference to the drawings, FIG. 8 depicts an embodiment of workstation injury avoidance system 300. The system 300 may be a system to reduce repetitive strain and fatigue injuries to the musculo-skeletal system of a user, and may share the same steps and/or elements associated with program/method 100, 200. System 300 may include a computer system 10 and the workstation injury avoidance program 100. The computer system 10 may include a processor 91, an input device 92 coupled to the processor 91, an output device 93 coupled to the processor 91, and at least one memory devices 95 coupled to the processor 91, and a workstation injury avoidance program implemented by the computer system 10. The workstation injury avoidance program 100, in view of system 300, may include the steps of determining, by the processor, a workstation environment of a user, wherein the determination of the workstation environment analyzes one or more factors of privacy, available space, and comfortability input by the user into the input device, presenting, by the processor of the computing system, a reminder to the user of the computing system after a variable interval of work, wherein the variable interval of work includes use of the computing system for a first period of time, instructing the user to perform a set of exercises after an acceptance, by the user, of the reminder to perform the set of exercises, the set of exercises tailored to the workstation environment of the user, wherein the instructions associated with the set of exercises include a demonstration to the user to ensure the proper execution of the exercises by the user to help reduce the probability of a workstation injury.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method for use with a computer comprising the computer implemented steps of:
    determining a workstation environment of a user, the workstation environment determined based on a plurality of factors including one or more of privacy, available space, and comfortability;
    providing a first reminder to the user to perform a first set of exercises after a first interval of work;
    instructing the user to perform the first set of exercises after a first acceptance, by the user, of the reminder to perform the first set of exercises, the first set of exercises tailored to the workstation environment of the user;
    providing a second reminder to the user to perform a second set of exercises after a second interval of work;
    instructing the user to perform the second set of exercises after a second acceptance, by the user, to perform the second set of exercises, the second set of exercises tailored to the workstation environment of the user;
    wherein the instructions associated with the first set of exercises and the second set of exercises include a demonstration to the user to ensure the proper execution of the exercises by the user to help reduce the probability of a workstation injury.

2. The method of claim 1, wherein the demonstration includes an audio/visual file.

3. The method of claim 1, wherein the first and second intervals of work are between 30-60 minutes of operating a computer system.

4. The method of claim 1, wherein the first and second intervals of work are variable according to a workload of the user.

5. The method of claim 1, wherein the workstation environment is classified as at least one of a small office, a large office, or a home office.

6. The method of claim 1, further comprising:
    providing an initial reminder after the user begins operation of the computing system, wherein a time between when the user begins operation of the computing system to the initial reminder is longer than the first and second interval of work;
    prompting the user with a health disclaimer prior to providing the initial reminder;
    providing the user an opportunity to postpone performing the first and second set of exercises; and
    providing the user an opportunity to cancel performing at least one of the first and second set of exercises.

7. A workstation injury avoidance method comprising:
    presenting to a user of a computing system, by a processor of the computing system, a plurality of inquiries to determine a workstation environment of the user;
    receiving, by the processor of the computing system, input from the user of the computing system, wherein the input are answers to the plurality of inquiries to determine the workstation environment of the user;
    determining, by the processor of the computing system, the workstation environment of the user, wherein the determination of the workstation environment analyzes one or more factors of privacy, available space, and comfortability;
    generating, by the processor of the computing system, at least a first set of exercises and a second set of exercises customizably associated with the workstation environment of the user;
    presenting, by the processor of the computing system, a reminder to the user of the computing system after an interval of work, wherein the interval of work includes use of the computing system for a first period of time;

receiving, by the processor of the computing system, an action by the user, wherein the action includes at least one of an acceptance, a postponement, and a cancellation of the reminder;

instructing the user of the computing system, by the processor of the computing system, to perform at least one of a first set of exercises or a second set of exercises customizably associated with the workstation environment of the user for a second period of time; and returning, by the processor of the computer system, after the expiration of the second period of time, to a dormant mode until another interval of work occurs.

8. The workstation injury avoidance method of claim 7, wherein the first period of time is between 30-100 minutes.

9. The workstation injury avoidance method of claim 7, wherein the first period of time is variable according to a workload of the user.

10. The workstation injury avoidance method of claim 7, wherein the workstation environment is classified as at least one of a small office, a large office, or a home office.

11. The workstation injury avoidance method of claim 7, wherein the first set of exercises include exercises and stretches involving a cervical and spine of the user of the computing system.

12. The workstation injury avoidance method of claim 7, wherein the second set of exercises include exercises and stretches involving a low back and a mid back of the user.

13. The workstation injury avoidance method of claim 7, wherein the second period of time is between 2-6 minutes.

14. The workstation injury avoidance method of claim 7, further comprising:

presenting, by the processor of the computing system, an initial reminder to the user of the computing system to perform a first set of exercises or a second set of exercises, wherein the initial reminder is the first reminder presented to the user after the user initially operates the computing system, and is longer than the interval of work;

presenting to the user of the computing system, by the processor of the computing system, at least one ergonomic tip prior to the expiration of the second period of time; and presenting, by the processor of the computing system, at least one audio/visual file which demonstrates the exercises and stretches included in the first and second set of exercises.

15. A system comprising:

a computer system, the computer system including:

a processor, an input device coupled to the processor, an output device coupled to the processor, and at least one memory devices coupled to the processor; and a workstation injury avoidance program stored on a non-tangible computer readable medium and implemented by the computer system, the workstation injury avoidance program configuring the computer system to perform the steps of:

determining, by the processor, a workstation environment of a user, wherein the determination of the workstation environment analyzes one or more factors of privacy, available space, and comfortability input by the user into the input device;

presenting, by the processor of the computing system, a reminder to the user of the computing system after a variable interval of work, wherein the variable interval of work includes use of the computing system for a first period of time;

instructing the user to perform a set of exercises after an acceptance, by the user, of the reminder to perform the set of exercises, the set of exercises tailored to the workstation environment of the user;

wherein the instructions associated with the set of exercises include a demonstration to the user to ensure the proper execution of the exercises by the user to help reduce the probability of a workstation injury.

16. The system of claim 15, wherein the demonstration includes an audio/visual file.

17. The system of claim 15, wherein the variable interval of work varies between 30-50 minutes, and varies depending on a workload of the user.

18. The system of claim 15, wherein the set of exercises have a duration between 2-6 minutes.

19. The system of claim 15, wherein the workstation environment is classified as at least one of a small office, a large office, or a home office.

* * * * *

UNITED STATES PATENT AND TRADEMARK OFFICE
CERTIFICATE OF CORRECTION

| | |
|---|---|
| PATENT NO. | : 8,550,820 B2 |
| APPLICATION NO. | : 12/902652 |
| DATED | : October 8, 2013 |
| INVENTOR(S) | : Gregory Soltanoff |

It is certified that error appears in the above-identified patent and that said Letters Patent is hereby corrected as shown below:

In the Specification

COLUMN 4

Line 65, delete "affectivity" and insert --affectively--

Signed and Sealed this
Eleventh Day of February, 2014

Michelle K. Lee
*Deputy Director of the United States Patent and Trademark Office*